United States Patent
Lee et al.

(10) Patent No.: US 10,519,917 B2
(45) Date of Patent: Dec. 31, 2019

(54) ENGINE OPERATION BASED ON INTEGRATED STARTER-GENERATOR TEMPERATURE

(71) Applicant: Ford Global Technologies, LLC, Dearborn, MI (US)

(72) Inventors: Josephine S. Lee, Novi, MI (US); Mark Shields, Plymouth, MI (US); Sassan Farahmand, Canton, MI (US); Bastian Hartmann, Cologne (DE); Paul Stephen Bryan, Saline, MI (US); Joseph Andrew Zamora, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 15/496,475

(22) Filed: Apr. 25, 2017

(65) Prior Publication Data

US 2018/0306157 A1 Oct. 25, 2018

(51) Int. Cl.
 *F02N 11/04* (2006.01)
 *B60W 20/50* (2016.01)
 *F02N 11/10* (2006.01)

(52) U.S. Cl.
 CPC ............. *F02N 11/04* (2013.01); *B60W 20/50* (2013.01); *F02N 11/10* (2013.01)

(58) Field of Classification Search
 CPC ........ F02N 11/04; F02N 11/10; F02N 11/101; F02N 2200/045; F02N 2300/2002; B60W 20/50
 See application file for complete search history.

(56) References Cited

U.S. PATENT DOCUMENTS

| | | | | |
|---|---|---|---|---|
| 6,313,560 B1* | 11/2001 | Dooley | ..................... | H02K 1/02 310/113 |
| 6,335,574 B1* | 1/2002 | Ochiai | ..................... | B60K 6/48 290/40 C |
| 8,996,227 B2 | 3/2015 | Sisk et al. | | |
| 9,260,106 B2 | 2/2016 | Schmidt et al. | | |
| 2002/0036434 A1* | 3/2002 | Tsuzuki | ..................... | B60K 6/40 310/83 |
| 2004/0257011 A1* | 12/2004 | Rechberger | ................ | H02P 9/00 318/139 |
| 2006/0150937 A1* | 7/2006 | Lupo | ..................... | F02D 41/042 123/179.4 |
| 2009/0284202 A1* | 11/2009 | Miura | ..................... | G01K 7/42 318/473 |
| 2010/0057323 A1* | 3/2010 | Jourdes | ..................... | F02N 11/04 701/101 |

(Continued)

*Primary Examiner* — Hunter B Lonsberry
*Assistant Examiner* — Donald J Wallace
(74) *Attorney, Agent, or Firm* — David Kelley; Brooks Kushman P.C.

(57) ABSTRACT

A vehicle includes an engine and a controller. The controller may be configured to, responsive to indication of a temperature of a starter-generator exceeding a de-rated threshold, command the engine to start and disable engine automatic shut-off. And the controller may be configured to, responsive to indication of the temperature exceeding a disabled threshold, or the temperature exceeding the de-rated threshold and a traction battery discharge power being less than a threshold, command the engine to start and shed a load.

15 Claims, 3 Drawing Sheets

(56) References Cited

U.S. PATENT DOCUMENTS

| | | | |
|---|---|---|---|
| 2010/0079118 A1* | 4/2010 | Matsui | H02J 7/1461 |
| | | | 322/34 |
| 2011/0234180 A1* | 9/2011 | Cullen | H02P 29/0241 |
| | | | 322/89 |
| 2012/0098329 A1* | 4/2012 | Jones | B60L 3/0061 |
| | | | 307/9.1 |
| 2015/0054337 A1* | 2/2015 | Ogale | B60L 15/007 |
| | | | 307/10.1 |
| 2015/0175150 A1* | 6/2015 | Zhao | F02N 11/0825 |
| | | | 701/22 |
| 2016/0185225 A1 | 6/2016 | Namuduri et al. | |
| 2017/0190435 A1* | 7/2017 | Kobayashi | B64D 27/24 |
| 2018/0320691 A1* | 11/2018 | Bendixen | F04D 7/06 |

* cited by examiner

ENGINE OPERATION BASED ON INTEGRATED STARTER-GENERATOR TEMPERATURE

TECHNICAL FIELD

The present disclosure relates to control systems for hybrid vehicles in which an internal combustion engine is operated based on a temperature of an integrated starter-generator.

BACKGROUND

Vehicles commonly employ transmissions to transfer power between an internal combustion engine and vehicle wheels. Hybrid and micro-hybrid vehicles may include control systems that are configured to shut down the engine of the vehicle in order to increase fuel economy and reduce emissions. In certain architectures, the vehicle also may have a traction motor connected at the input of the transmission, in which the traction motor is electrically connected to a traction battery. The motor may be used in either a motoring mode in which energy from the battery is used to supplement the engine power or in a generating mode in which the motor converts mechanical energy into electrical energy which is stored in the battery. Some vehicles also include a starter/generator, such as a belt integrated starter/generator (BISG) that is electrically connected to an auxiliary battery, typically a low-voltage battery. A vehicle with a BISG may supply a charge to the low-voltage battery by either the BISG or the traction motor/traction battery.

SUMMARY

A vehicle includes an engine and a controller. The controller may be configured to, responsive to indication of a temperature of a starter-generator exceeding a de-rated threshold, command the engine to start and disable engine automatic shut-off. And the controller may be configured to, responsive to indication of the temperature exceeding a disabled threshold, or the temperature exceeding the de-rated threshold and a traction battery discharge power being less than a threshold, command the engine to start and shed a load.

A vehicle includes an engine, an integrated starter-generator (ISG), and a controller. The may be controller configured to, responsive to indication of a ISG temperature exceeding a de-rated threshold that is greater than a percentage of a Curie temperature, command the engine to start and disable engine automatic shut-off, wherein the percentage is associated with a permanent magnetic field strength (PMFS) having a value that is ½ of the PMFS at 0 degrees Celsius.

A method of controlling a vehicle includes, by a controller, responsive to receiving indication of a temperature of an integrated starter-generator (ISG) exceeding a de-rated threshold, commanding an engine coupled with the ISG to start and disabling engine shut-off; and responsive to receiving indication of the temperature exceeding a disable threshold, disabling low-voltage loads.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a hybrid vehicle the engine may be started using a disconnect clutch, a starter, or belt integrated starter/alternator (ISG or BISG). However, as a temperature of the ISG increases, the magnetization of the magnets of the ISG decrease. For example, the Curie temperature (Tc), or Curie point, of a material is the temperature at which the material loses its permanent magnetic properties. Often as a temperature of a magnet approaches the Curie temperature, the magnetism drops off quickly. For example, a magnetic may be able to be able to apply a force sufficient to lift (i.e., overcome the force of gravity) 25 washers at 0 degrees Celsius, however when the temperature of the magnetic is increased to 100 degrees Celsius, that same magnet may only be able to lift 5 washers. The strength of a permanent magnet may be referred to as a permanent magnetic field strength (PMFS). An ISG or BISG may use permanent magnetics in a rotor to create a rotating magnetic field that spins based on an inducted field created by current flowing through windings of a stator. A torque of the motor may be proportional to the PMFS that is related to the temperature of the permanent magnets. Therefore, the energy generating capabilities of an electric machine (e.g., ISG) decreases as the temperature increases. In the case of an ISG, if the temperature of the ISG increases such that the torque generation capability, at the temperature, drops to a level below a threshold needed to start an internal combustion engine (ICE), the ISG would not be able to start the ICE and the batteries may be depleted. Here, an ICE is started when a temperature of an ISG exceeds a threshold (e.g., a de-rated threshold), and the ICE is continually operated until the temperature of the ISG drops below a low threshold.

For example, consider an ISG having 4 operating conditions, level 0, 1, 2, and 3. The first condition is level 0 in which an ISG temperature is below a low threshold. Operation in level 0 is considered normal operation. Next is level 1 in which operation of the ISG is when the ISG temperature is below a medium threshold. Level 1 may be considered a hysteresis zone in which configure of auto-start/auto-stop does not change. Level 2 is operation of the ISG in which the ISG temperature is above the medium threshold and below a hot temperature. Often, the medium threshold is a predetermined range from hot or upper threshold. If the ISG temperature exceeds the medium threshold (e.g., a de-rated threshold), external cooling of ISG is desired. Cooling during level 2 may be accomplished by operation of a fan to circulate air around the ISG. The final level is level 3 that is when the temperature of the ISG exceeds an upper or hot threshold (e.g., a disable threshold). Here, operation of the ISG is halted, while in addition to active cooling, a reduction in power usage by low voltage loads is performed. The reduction in power usage may include disabling of comfort and convenience loads including seat heaters, seat ventilators, rear seat video displays, an air-conditioning A/C compressor, a positive thermal coefficient (PTC) heater. However, the reduction in power may also include a reduction is power used by non-comfort and convenience loads, for example, a reduction in power to a PTC heater, rear climate seats, heated steering wheel, front climate/heated/ventilated seats, a rear blower, a front windscreen heater, a heated wiper park area, a rear defroster, and heated mirrors. In this example, the de-rated threshold may be a temperature at a first percentage (e.g., 25, 33, 40, or 50%) of the Curie temperature, while the disable threshold may be a temperature at a second percentage (e.g., 50, 60, 66, or 75%) of the Curie temperature.

Figure 1:
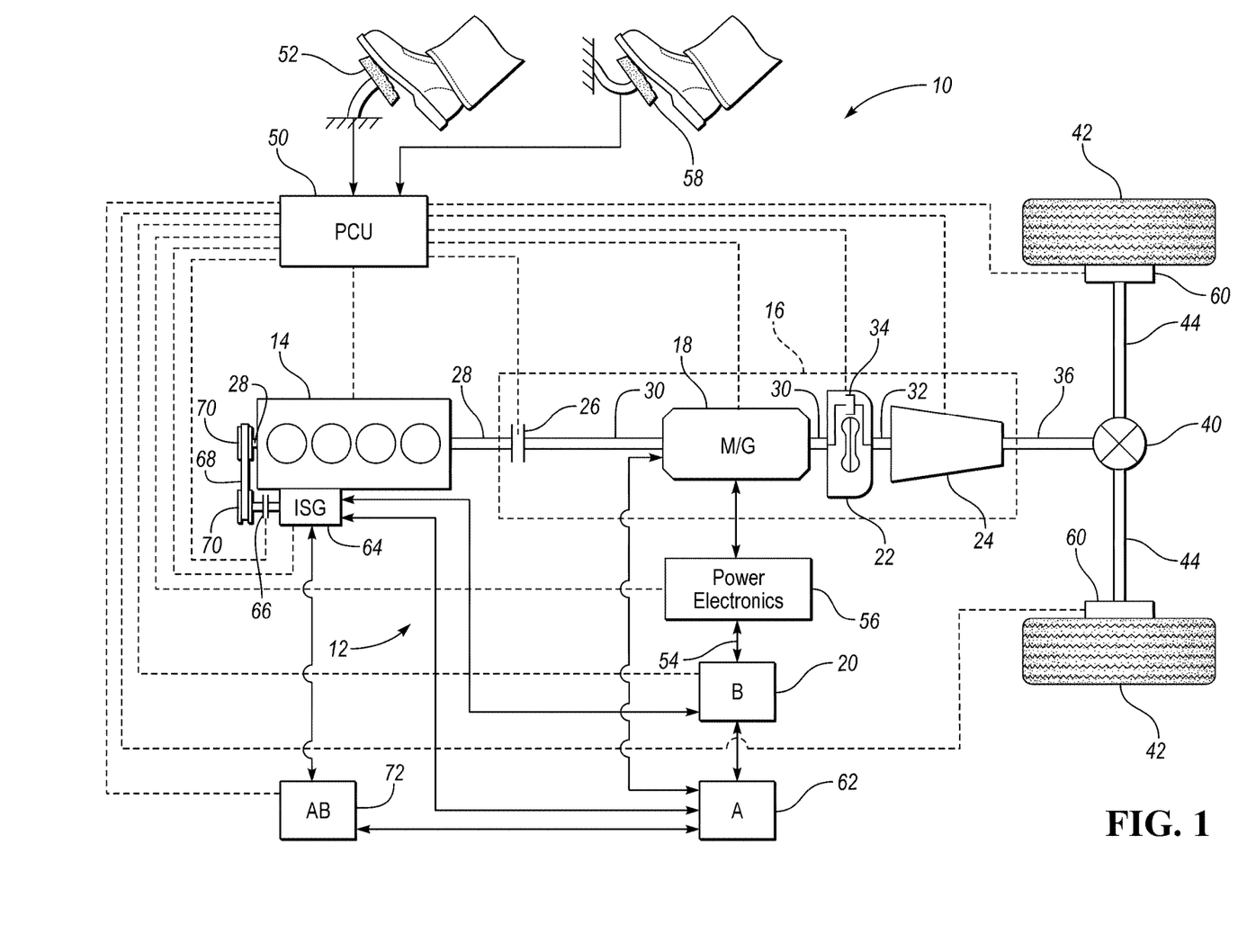
FIG. 1 is a diagram of a hybrid vehicle including a belt integrated starter-generator.

Referring to FIG. 1, a schematic diagram of a hybrid electric vehicle (HEV) 10 is illustrated according to an embodiment of the present disclosure. The HEV 10 includes a powertrain 12. The powertrain 12 includes an engine 14 that drives a transmission 16, which may be referred to as a modular hybrid transmission (MHT). As will be described in greater detail below, the transmission 16 includes an electric machine, e.g. an electric motor/generator (M/G) 18, an associated traction battery 20, a torque converter 22, and a multiple step-ratio automatic transmission, or gearbox 24. Although this vehicle is shown as a HEV 10, the vehicle is illustrative of components used in a conventional internal combustion engine (ICE) vehicle by removing select HEV components including the M/G 18, the the power electronics 56, and the disconnect clutch 26.

The engine 14 and the M/G 18 both act as drive sources and are configured to propel the HEV 10. The engine 14 may be an internal combustion engine fueled by gasoline, diesel, or natural gas, or a fuel cell. The engine 14 generates an engine power and corresponding engine torque that is supplied to the M/G 18 when a disconnect clutch 26 between the engine 14 and the M/G 18 is at least partially engaged. The M/G may be a permanent magnet synchronous motor or any one of a various type of electric machines. Power electronics facilitate a flow of direct current (DC) power provided by the battery 20 to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, a launch clutch similar to disconnect clutch 26 may be provided between the M/G 18 and gearbox 24 for applications that do not include a torque converter 22 or a torque converter bypass clutch 34.

The gearbox 24 is a gearing arrangement that includes a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

The gearing arrangement is controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). In another example, the transmission may be a manual transmission. Power and torque from both the engine 14 and the M/G 18 may be delivered to and received by gearbox 24. The gearbox 24 then provides powertrain output power and torque to output shaft 36.

The output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68, it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72 (via the DC/DC converter), the traction battery 20, or provide electrical energy to power the vehicle accessories 62 when operating as a generator. In another example, the traction battery 20 may charge the accessory battery using a DC/DC voltage converter. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

Figure 2:
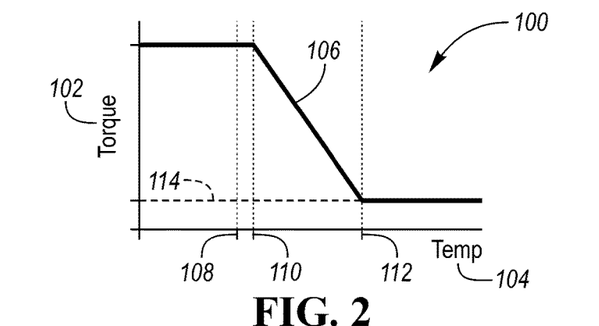
FIG. 2 is a graphical representation of a torque command profile for an integrated starter-generator with respect to temperature.

FIG. 2 is a graphical representation 100 of a torque or command 102 for an integrated starter-generator with respect to temperature 104. This graphical representation 100 illustrates a torque command profile 106 at a low temperature threshold 108, a medium temperature threshold 110, and a high temperature threshold 112. Likewise, this graphical representation may substitute power for torque in element 102 whereas the profile 106 is illustrative of a power profile with respect to temperature 104. Here, the torque command is shown having a torque level for an ISG (e.g., ISG 64 of FIG. 1) that is generally constant in zone 0 that is at a temperature less than the low temperature threshold 108, and in zone 1 that is at a temperature of the ISG that is less than the mid temperature threshold 110. However, when the temperature of the ISG exceeds the mid temperature threshold 110, the controller operates in zone 2 until the temperature reaches the upper threshold 112, after which the controller operates in zone 3. In zone 2, the controller will limit the torque of the ISG according to a profile such as the linear profile shown in FIG. 2. When the temperature of the ISG exceeds the upper threshold 112, the controller will operate in zone 3 in which the torque is reduced to a low torque level 114 and low voltage loads may be reduced or shut-off.

Figure 3:
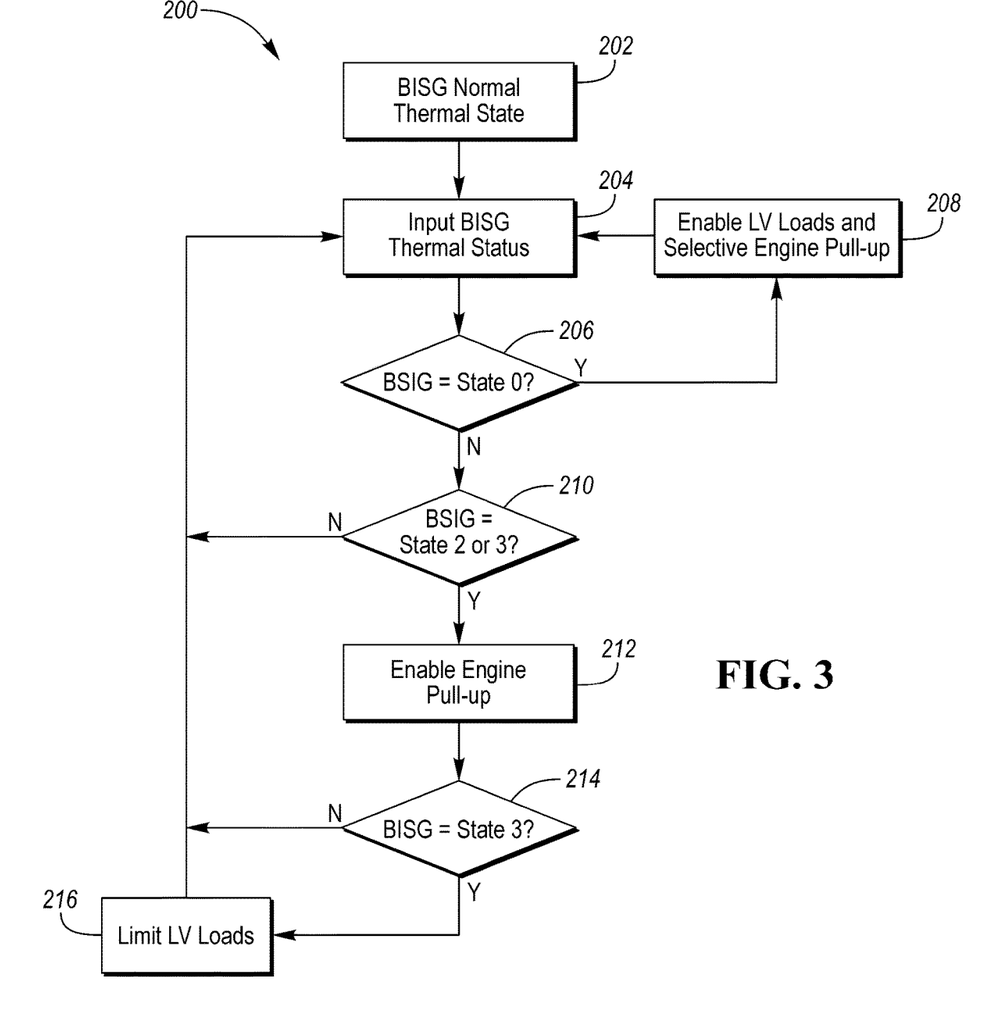
FIG. 3 is a control diagram illustrating a method for controlling an engine of a vehicle with an integrated starter-generator based on a state of the starter-generator.

FIG. 3 is a control diagram 200 illustrating a method for controlling an engine of a vehicle (e.g., engine 14 of FIG. 1) with an integrated starter-generator (e.g., ISG 64 of FIG. 1) based on a state of the starter-generator.

Here a controller begins at operation 202 when a belt integrated starter-generator BISG or ISG is in a normal operating state. In operation 202, the controller is configured to permit auto-stop of an engine (e.g. engine 14 of FIG. 1) and low voltage loads are enabled. Low voltage loads include a PTC heater, rear climate seats, heated steering wheel, front climate/heated/ventilated seats, rear blower, front windscreen, heated wiper park, rear defroster, and heated mirrors. the controller will continue to operation 204.

In operation 204, the controller will receive a signal such as a BISG thermal status. This status input may be an analog signal or a digital signal. The signal may be read directly from a sensor or may be transmitted from another controller or module. After the status input is received, the controller will continue to operation 206. In operation 206, the controller will branch when a state or status is 0 to operation 208, and will continue to operation 210 if the state of status is anything other than 0. For example, if the state is 1, 2, or 3 the controller will branch to operation 210.

In operation 208, low voltage loads are enabled and auto-stop is enabled such that an engine may be selectively started and stopped. In operation 210, the controller will branch when the state of the ISG is 2 or 3 to operation 212. In all other states of the BISG, the controller will branch back to operation 204. Thus, if the state of the BISG is 1, the controller will branch back to operation 204 and the controller will not adjust or change the status of the low voltage loads nor starting/stopping of the engine.

In operation 212, the controller will inhibit auto-stop of the engine and if the engine is stopped the controller will auto-start the engine. After, the controller will proceed to operation 214. In operation 214, the controller will branch when the state of the ISG is 3 to operation 216. If the state of the ISG is not 3, the controller will return to operation 204 and the controller will not adjust or change the status of the low voltage loads. In operation 216, the controller will limit or inhibit operation of low voltage loads. For example, a PTC heater may be reduced to a predetermined level or disabled, rear climate seats may be limited to a predetermined value or disabled, a heated steering wheel may be limited to a predetermined value (e.g., 65%) or disabled, front climate/heated/ventilated seats may be disabled, a rear blower may be limited to a predetermined value (e.g., 75%) or disabled, a front windscreen may be disabled, a wiper park heater may be disabled, a rear defroster may be disabled, and heated mirrors may be disabled.

Figure 4:
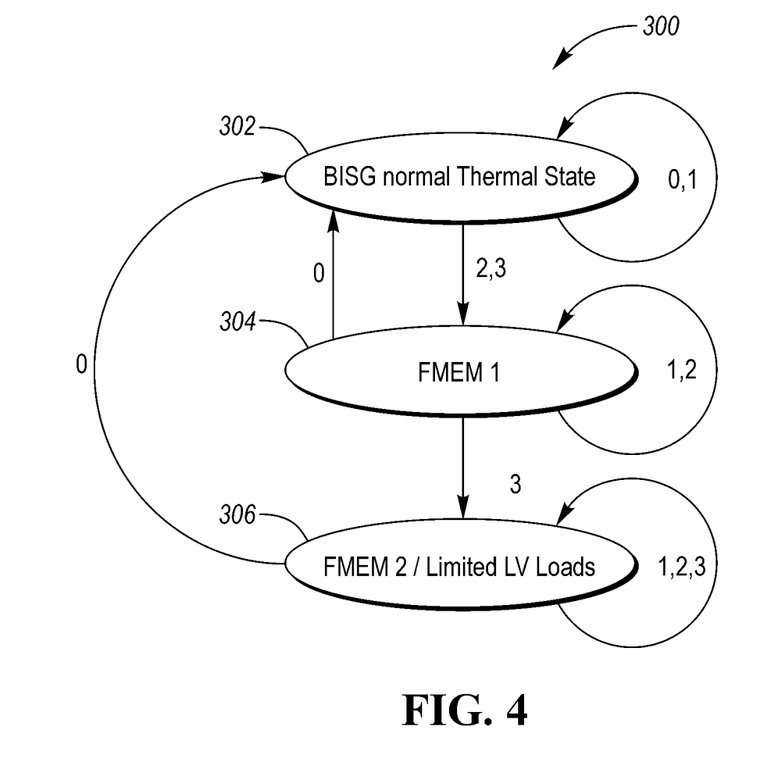
FIG. 4 is a state diagram of a method for controlling an engine of a vehicle with an integrated starter-generator based on a state of the starter-generator.

FIG. 4 is a state diagram 300 of a method for controlling an engine of a vehicle with an integrated starter-generator based on a state of the starter-generator. In this state diagram 300, When the system is in a normal operating state 302, a controller operates such that low voltage loads are enabled and auto-stop is enabled such that an engine may be selectively started and stopped. When the condition is 0 or 1, the controller will maintain the system in the normal operating state 302, however, when the condition is 2 or 3, the controller will set the system to an FMEM 1 operating state 304.

In the FMEM 1 operating state 304 the controller will disable an auto-stop feature such that an engine may not be automatically stopped when operating and the controller will output a signal to automatically start the engine. When the condition is 1 or 2, the controller will hold the system in the FMEM 1 operating state 304. When the condition is 0, the controller will set the system in the normal operating state 302, and when the condition is 3, the controller will set the system in an FMEM 2 operating state 306.

In the FMEM 2 operating state 306, the controller will limit or inhibit operation of low voltage loads while keeping auto-stop disabled and maintaining engine operation. For example, the limited or inhibited operation of low voltage loads may include a PTC heater that may be reduced to a predetermined level or disabled, rear climate seats may be limited to a predetermined value (e.g., 65%) or disabled, a heated steering wheel may be limited to a predetermined value (e.g., 65%) or disabled, front climate/heated/ventilated seats may be disabled, a rear blower may be limited to a predetermined value (e.g., 75%) or disabled, a front windscreen may be disabled, a wiper park heater may be disabled, a rear defroster may be disabled, and heated mirrors may be disabled.

It should be noted that the examples of FIG. 3 and FIG. 4 references 4 operational states of a BISG, however, the concepts of this invention may be applied to additional operating states. For example, a BISG having 6 operational states may operate in a normal operating state (e.g., 302) during BISG states 0, 1, 2, and may transition to the FMEM 1 operating state (e.g., 304) responsive to BISG states 3, 4, or 5. Once in the FMEM 1 operating state, the controller may maintain operation while BISG states are 2, 3, or 4, and transitioning back to the normal operating state (e.g., 302) while BISG states are 0 or 1. Further, the controller may transition to the FMEM 2 operating state (e.g., 306) responsive to BISG states 5. Once in the FMEM 2 operating state, the controller may maintain operation while BISG states are 2, 3, 4 or 5, and transitioning back to the normal operating state (e.g., 302) while BISG states are 0 or 1.

In another example, considering a BISG with 6 states, the FMEM 2 operating state (e.g., 306) may have two internal levels. Once in the FMEM 1 operating state, the controller may maintain operation while BISG states are 2 or 3, and transitioning back to the normal operating state (e.g., 302) while BISG states are 0 or 1. Further, the controller may transition to the FMEM 2 operating state (e.g., 306) responsive to BISG states 4, or 5. Once in the FMEM 2 operating state, the controller may maintain operation while BISG states are 2, 3, 4 or 5, and transitioning back to the normal operating state (e.g., 302) while BISG states are 0 or 1. However, if the state is 4, the controller may limit specific loads, (e.g., only the rear climate seats, heated steering wheel, front climate/heated/ventilated seats, and rear blower may be limited to a predetermined value or disabled). And if the state is 5, the controller may limit all available limitable loads.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine; and
   a controller configured to,
      responsive to indication of a temperature of a starter-generator exceeding a de-rated threshold, command the engine to start and disable engine automatic shut-off,
      responsive to indication of the temperature exceeding a disable threshold, or the temperature exceeding the de-rated threshold and a traction battery discharge power being less than a threshold, command the engine to start and shed a load, and
      responsive to indication of the temperature dropping below the de-rated threshold and dropping below a first threshold, enable engine shut-off, wherein the first threshold is less than the de-rated threshold and the de-rated threshold is less than the disable threshold.

2. The vehicle of claim 1, wherein the controller is further configured to, responsive to indication of the temperature dropping below the disable threshold and the de-rated threshold, enable automatic engine shut-off and permit enabling of the load.

3. The vehicle of claim 2, wherein the load is a seat heater, a seat ventilator, a positive thermal coefficient heating element, or an air conditioner compressor.

4. The vehicle of claim 1, wherein the de-rated threshold is greater than a first percentage of a Curie temperature, and wherein the first percentage is associated with a permanent magnetic field strength (PMFS) having a value that is ½ of the PMFS at 0 degrees Celsius.

5. The vehicle of claim 4, wherein the disable threshold is greater than a second percentage of the Curie temperature and less than the de-rated threshold, and wherein the second percentage is associated with the PMFS having a value that is ¼ of the PMFS at 0 degrees Celsius.

6. The vehicle of claim 1, wherein the starter-generator is a belt integrated starter-generator.

7. A vehicle comprising:
   an engine;
   an integrated starter-generator (ISG); and
   a controller configured to,
      responsive to indication of a ISG temperature exceeding a de-rated threshold that is greater than a percentage of a Curie temperature, command the engine to start and disable engine automatic shut-off, wherein the percentage is associated with a permanent magnetic field strength (PMFS) having a value that is ½ of the PMFS at 0 degrees Celsius.

8. The vehicle of claim 7 wherein the controller is further configured to, responsive to indication of the ISG temperature exceeding a disabled threshold that is greater than an other percentage of the Curie temperature and less than the de-rated threshold, or the ISG temperature exceeding the de-rated threshold and a traction battery discharge power being less than a threshold, command the engine to start and shed a low-voltage load, and wherein the other percentage is associated with the PMFS having a value that is ¼ of the PMFS at 0 degrees Celsius.

9. The vehicle of claim 8, wherein the controller is further configured to, responsive to indication of the ISG temperature dropping below the de-rated threshold and dropping below a first threshold, enable engine shut-off, and wherein the first threshold is less than the de-rated threshold and the de-rated threshold is less than the disable threshold.

10. The vehicle of claim 9, wherein the controller is further configured to, responsive to indication of the ISG temperature dropping below the disable threshold, the de-rated threshold, and the first threshold, enable engine shut-off and permit enabling of the low-voltage load.

11. The vehicle of claim 10, wherein the low-voltage load is a seat heater, a seat ventilator, a positive thermal coefficient heating element, or an air conditioner compressor.

12. The vehicle of claim 10, wherein the ISG is a belt ISG.

13. A method of controlling a vehicle comprising:
by a controller,
responsive to receiving indication of a temperature of an integrated starter-generator (ISG) exceeding a de-rated threshold, commanding an engine coupled with the ISG to start and disabling engine shut-off;
responsive to receiving indication of the temperature exceeding a disable threshold, disabling a load; and
responsive to indication of the temperature dropping below the de-rated threshold and dropping below a first threshold, enabling engine shut-off, wherein the first threshold is less than the de-rated threshold and the de-rated threshold is less than the disable threshold.

14. The method of claim 13, wherein the ISG is a belt ISG.

15. The method of claim 13, wherein, responsive to indication of the temperature dropping below the disable threshold and the de-rated threshold, enabling automatic engine shut-off and permitting enabling of the load.

* * * * *